May 26, 1970     D. ALLPORT     3,513,720

BREAKAWAY HANDLE

Filed July 26, 1968

INVENTOR
DAVIES ALLPORT
BY
Kane, Dalsimer, Kane, Sullivan & Smith
ATTORNEYS

# United States Patent Office 3,513,720
Patented May 26, 1970

3,513,720
BREAKAWAY HANDLE
Davies Allport, La Jolla, Calif., assignor to Amerace Corporation, New York, N.Y., a corporation of Delaware
Filed July 26, 1968, Ser. No. 748,010
Int. Cl. F16d *1/06;* G05g *1/10*
U.S. Cl. 74—553         5 Claims

ABSTRACT OF THE DISCLOSURE

A breakaway handle for use on vehicular instruments includes a knob for finger operation by the user and a hollow sleeve extending rearwardly for engaging a control member of the instrument. The sleeve includes a reduced wall section in a predetermined location so that if a vehicle passenger is accidentally thrown against the knob causing a predetermined stress, the knob will break off at the reduced wall section thus substantially improving the safety of the passenger.

BACKGROUND OF THE INVENTION

This invention relates to a breakaway handle and, more particularly, a plastic breakaway handle for use on vehicular instruments which breaks off if a vehicle passenger is accidentally thrown against the handle thus substantially improving the safety of the passenger.

The trend in recent years in designing interiors of vehicles, e.g. automobiles, airplanes, etc., is to provide safety features for passengers in case of an accident. Such safety features in automobiles, for example, include pop-out windshields, collapsable steering columns and the like. However, the instrument panel of automobiles and many other vehicles include knobs and other handles which can cause serious injury if a passenger is accidentally thrown against them.

Although many attempts were made to overcome the foregoing and other difficulties, none, as far as I am aware, was entirely satisfactory when carried into practice commercially.

BRIEF SUMMARY

I have now developed a handle for use on vehicular instruments which will break off at a predetermined location when a passenger is accidentally thrown against it thus improving the safety of the passenger.

It is an object of this invention to provide a handle for use on vehicular instruments which will break off at a predetermined location when a passenger is accidentally thrown against it.

Another object of this invention is to provide a plastic, molded breakaway handle which can be cheaply constructed in large volume for use on automobile instrument panels.

Other objects and advantages of the invention will become apparent from the following description taken in conjunction with the accompanying drawings in which.

DESCRIPTION OF THE INVENTION

In accordance with the present invention, the breakaway handle for use on vehicular instruments includes a knob for finger operataion by the user. A hollow sleeve extends rearwardly of the knob for engaging an instrument control member. The sleeve is also provided with a reduced wall section in a predetermined area so that if a vehicle passenger is accidentally thrown against the knob causing a shear stress in the reduced wall section which exceeds the shear strength of this section, the knob will break off in the reduced wall section, thus substantially improving the safety of the passenger.

If the sleeve is formed separately of the knob, with a mating surface therebetween, an adhesive can be employed to maintain friction engagement about the thin wall section so that the knob will break off in the reduced or thin wall section along the mating surface. As an alternative, the knob and sleeve may be press fit or shot molded.

PREFERRED EMBODIMENTS

Figure 1:
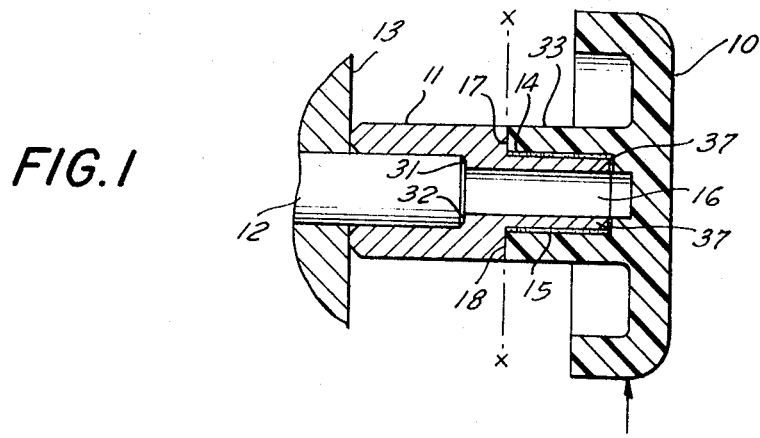
FIG. 1 shows a sectional view of the breakaway handle inserted over the control member of a instrument.

Referring now to the drawings, FIG. 1 shows a sectional view of a plastic breakaway handle having a sleeve 11 inserted over a control member 12 of an instrument 13. The sleeve 11 has an internal stop shoulder 31 and 32 and a hollow projection 37 of reduced wall section and extending forward from the sleeve forming an external stop shoulder 17 and 18 with the sleeve. A knob 10, which can be finger operated or gripped by the user of the instrument, has a recess into which the sleeve projection 37 is inserted so that a mating surface (designated X—X in FIG. 1) is formed therebetween at the external stop shoulder 17 and 18 of the sleeve. An adhesive 14 and 15 may maintain friction engagement between the internal wall of the knob recess and the sleeve projection 37. The mating surface X—X is free from adhesive so that if a vehicle passenger is accidentally thrown against the knob causing a shear stress in the direction of the arrow in the thin walled projection 37 which exceeds the shear strength of the plastic, the knob will break off at the mating surface X—X thus substantially improving the safety of the vehicle passenger.

Figure 2:
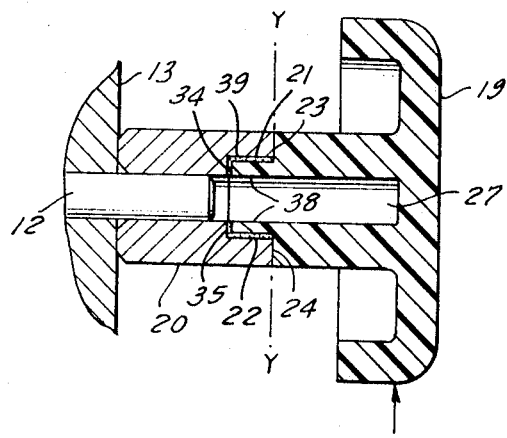
FIG. 2 is a sectional view of a second embodiment of the handle inserted over the control member of an instrument.

FIG. 2 depicts a second embodiment of my invention wherein a sleeve 20 is inserted over a control member 12 of an instrument 13. A knob 19 has a hollow projection 38 of reduced wall section extending rearwardly and forming an external stop shoulder 34 and 35 with the knob for insertion into sleeve recess to form a mating surface therebetween designated Y—Y. Also included is an adhesive 21 and 22 for maintaining friction engagement between the knob projection 38 and the recess wall of the sleeve 39. The mating surface Y—Y is free from adhesive so that when a force is applied in the direction of the arrow causing a shear stress in the reduced wall section 38 in excess of the shear strength, the knob will break off along the line Y—Y.

Figure 3:
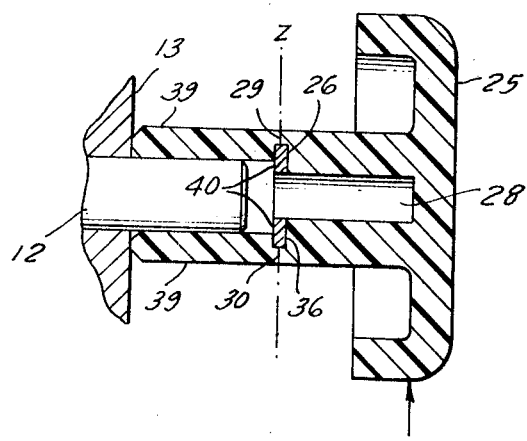
FIG. 3 is a sectional view of a third embodiment of the handle inserted over the control member of an instrument.

FIG. 3 is a sectional view of a third embodiment of my invention wherein a knob 25 which can be finger operated or gripped by the user of instrument 13 has a rearwardly extending sleeve 39 for insertion over control member 12. The sleeve has internal stop shoulders 26 and 36 and a reduced sleeve wall section 29 and 30 adjacent stop shoulders 26 and 36. A washer 40 is included in the cutout area forming reduced sections 29 and 30 to facilitate molding of the reduced wall section but does not substantially contribute to the shear strength of the reduced wall section. If a vehicle passenger is accidentally thrown against the knob causing a force in the direction of the arrow, for example, which in turn causes a stress in the reduced wall section of the sleeve which exceeds the shear strength of the plastic, the handle will break off in the reduced sleeve wall section along line Z—Z thus substantially improving the safety of the passenger.

The safety handles in accordance with my invention can be economically molded from plastic in large volume by a two-shot process in which the sleeve is formed separately from the knob, as shown in FIGS. 1 and 2, or in one complete section as shown in FIG. 3. The knob, sleeve, or both, may be formed from conventional plastic materials commonly in use on vehicular instrument panels, e.g. automobile radio volume controls. The knob, although shown only in section in FIGS. 1 to 3, may be of any shape, e.g. circular, angular, etc. generally in use on instrument panels.

This invention permits the designer great latitude in estimating the direction and type of forces which will be applied to the knob should a passenger accidentally be thrown against it. Thus, thin or reduced wall sections 37, 38, 29 and 30 can be designed with a section size commensurate with the estimated distribution of stress across these members. Accordingly, by designing very thin sections, a small force will cause the knobs to break off along the lines X—X, Y—Y, or Z—Z depending on the particular embodiment. Thicker sections, of course, require a larger force for fracture and therefore more impact from a passenger thrown against the knob. In short, the designer is permitted the latitude of choosing a predetermined plane in which the knob will break and a predetermined force to cause the break.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A breakaway handle for use on vehicular instruments, said handle comprising a knob for finger operation by the user and a hollow sleeve extending rearwardly of and movable with said knob and having an open end remote from said knob, said sleeve adapted to receive an instrument control member to a predetermined depth from said open end and having, at a predetermined longitudinally limited location spaced from said open end a distance greater than said predetermined depth, a reduced wall section of substantially constant radial dimension in all transverse directions, so that if a vehicle passenger is accidentally thrown against the handle causing a shear stress in the reduced wall section which exceeds the shear strength thereof, the handle will fracture at the reduced wall section, whereby the safety of the passenger is substantially improved.

2. A breakaway handle in accordance with claim 1 wherein the sleeve includes a hollow projection of reduced wall section extending forward from the sleeve forming an external stop shoulder with the sleeve; the knob includes a recess into which the sleeve projection is inserted so that a mating surface is formed therebetween at the external stop shoulder of the sleeve; an adhesive for application between the internal wall of the knob recess and the sleeve projection so that if a vehicle passenger is accidentally thrown against the knob causing a shear stress in the reduced wall section which exceeds the shear strength of this section, the knob will break off in the reduced wall section along the mating surface, whereby the safety of the passenger is substantially improved.

3. A breakaway handle in accordance with claim 2 formed of plastic.

4. A plastic breakaway handle in accordance with claim 1 wherein the sleeve includes a recess at the forward end; the knob includes a hollow projection of reduced wall section extending rearwardly and forming an external stop shoulder with the knob for insertion into the sleeve recess to form a mating surface therebetween; and an adhesive applied between the knob projection and the recess wall of the sleeve so that if a vehicle passenger is accidentally thrown against the knob causing a shear stress in the reduced wall section which exceeds the shear strength of this section, the knob will break off in the reduced wall section along the mating surface, whereby the safety of the passenger is substantially improved.

5. A breakaway handle in accordance with claim 4 formed of plastic.

References Cited

UNITED STATES PATENTS 2,651,281  9/1953  Nathan.
3,188,124  6/1965  Pestka et al. _____ 74—553 XR

FOREIGN PATENTS 355,076  8/1931  England.

MILTON KAUFMAN, Primary Examiner

F. D. SHOEMAKER, Assistant Examiner

U.S. Cl. X.R.

16—121; 287—53